(12) United States Patent
Onkar et al.

(10) Patent No.: US 12,277,160 B2
(45) Date of Patent: Apr. 15, 2025

(54) SEARCH APPARATUS, TRAINING APPARATUS, SEARCH METHOD, TRAINING METHOD, AND PROGRAM

(71) Applicant: NIPPON TELEGRAPH AND TELEPHONE CORPORATION, Tokyo (JP)

(72) Inventors: Krishna Onkar, Tokyo (JP); Go Irie, Tokyo (JP); Xiaomeng Wu, Tokyo (JP); Takahito Kawanishi, Tokyo (JP); Kunio Kashino, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 641 days.

(21) Appl. No.: 17/440,166

(22) PCT Filed: Sep. 10, 2019

(86) PCT No.: PCT/JP2019/035526
§ 371 (c)(1),
(2) Date: Sep. 16, 2021

(87) PCT Pub. No.: WO2020/194792
PCT Pub. Date: Oct. 1, 2020

(65) Prior Publication Data
US 2022/0188345 A1 Jun. 16, 2022

(30) Foreign Application Priority Data
Mar. 26, 2019 (JP) .................................. 2019-059437

(51) Int. Cl.
*G06F 16/00* (2019.01)
*G06F 16/432* (2019.01)
(Continued)

(52) U.S. Cl.
CPC .......... *G06F 16/434* (2019.01); *G06F 16/433* (2019.01); *G06F 18/2148* (2023.01); *G06N 3/045* (2023.01)

(58) Field of Classification Search
CPC ............................ G06F 16/434; G06F 16/433
(Continued)

(56) References Cited

U.S. PATENT DOCUMENTS

| 10,860,898 B2 * | 12/2020 | Yang | G06N 5/022 |
| 2016/0379041 A1 * | 12/2016 | Rhee | G06V 10/32 382/118 |

OTHER PUBLICATIONS

Pele et al. (2007) "Accelerating pattern matching or how much can you slide?", In Asian Conference on Computer Vision, Nov. 18, 2007, Springer, Berlin, Heidelberg, pp. 435-446.
(Continued)

*Primary Examiner* — Chelcie L Daye

(57) ABSTRACT

A search apparatus for searching media data for a target region that matches query data includes a first feature extraction unit configured to extract a first feature vector from the query data using a first trained neural network; a second feature extraction unit configured to obtain a first region from the media data and extract a second feature vector from the first region using a second trained neural network; a localization unit configured to determine a candidate for the target region using a third trained neural network, based on the first feature vector, the second feature vector, and the first region or a location of the first region; and a control unit configured to repeat the operations of the second feature extraction unit and the localization unit until a predetermined condition is satisfied, by using the determined candidate for the target region as the first region to be used by the second feature extraction unit.

9 Claims, 10 Drawing Sheets

(51) Int. Cl.
  *G06F 18/214* (2023.01)
  *G06N 3/045* (2023.01)
(58) Field of Classification Search
  USPC .......................................................... 707/770
  See application file for complete search history.

(56) References Cited

OTHER PUBLICATIONS

Dekel et al. (2015) "Best-buddies similarity for robust template matching", In Proceedings of the IEEE Conference on Computer Vision and Pattern Recognition, pp. 2021-2029.
Korman et al. (2013) "Fast-match: Fast affine template matching", In Proceedings of the IEEE Conference on Computer Vision and Pattern Recognition, pp. 2331-2338.
Jiao et al. (2018) "A fast template matching algorithm based on principal orientation difference", International Journal of Advanced Robotic Systems, 15(3):1729881418778223.
Ba et al. (2014) "Multiple object recognition with visual attention", arXiv preprint arXiv:1412.7755, Dec. 24, 2014.
Ablavatski et al. (2017) "Enriched deep recurrent visual attention model for multiple object recognition", In Applications of Computer Vision (WACV), IEEE Winter Conference on Mar. 24, 2017, pp. 971-978.
Mnih et al. (2014) "Recurrent models of visual attention", In Advances in neural information processing systems, pp. 2204-2212.
Hel-Or et al. (2011) "Fast template matching in non-linear tone-mapped images", In Computer Vision (ICCV), IEEE International Conference on Nov. 6, 2011, pp. 1355-1362.

* cited by examiner

| DATASET | TRANSLATED MNIST | CLUTTERED MNIST | MIXED MNIST | FLICKR LOGOS-32 |
|---|---|---|---|---|
| JOINT-TRAINING | 0.95 | 0.91 | 0.88 | 0.39 |
| MTM | 0.68 | 0.20 | 0.15 | 0.28 |
| BBS | 0.70 | 0.11 | 0.08 | 0.36 |

FIG.8

| DATASET | TRANSLATED MNIST | CLUTTERED MNIST | MIXED MNIST | FLICKR LOGOS-32 |
|---|---|---|---|---|
| JOINT-TRAINING | 6 | 8 | 8 | 6 |
| MTM | 5329 | 5329 | 5329 | 18298 |
| BBS | 10000 | 10000 | 10000 | 40112 |

FIG.9

| DATASET | TRANSLATED MNIST | CLUTTERED MNIST | MIXED MNIST | FLICKR LOGOS-32 |
|---|---|---|---|---|
| JOINT-TRAINING | 1 | 3 | 4 | 6 |
| MTM | 2 | 3 | 5 | 230 |
| BBS | 132 | 141 | 148 | 2390 |

FIG.10

SEARCH APPARATUS, TRAINING APPARATUS, SEARCH METHOD, TRAINING METHOD, AND PROGRAM

CROSS-REFERENCE TO RELATED APPLICATIONS

This application is a U.S. 371 Application of International Patent Application No. PCT/JP2019/035526, filed on 10 Sep. 2019, which application claims priority to and the benefit of JP Application No. 2019-059437, filed on 26 Mar. 2019, the disclosures of which are hereby incorporated herein by reference in their entireties.

TECHNICAL FIELD

The present invention relates to a search apparatus, a training apparatus, a search method, a training method, and a program, which can be used to search media data for a target region that matches query data.

BACKGROUND ART

With recent advancement in image capturing technologies, a vast amount of images in a large variety of formats are made available worldwide on daily basis. Moreover, the quantity, complexity, diversity, and dimensionality of these images are also increasing. With the increase in images, there is an increasing demand for finding a target region that matches a query image from a large number of candidate regions in a reference image more efficiently and accurately. This is a fundamental problem in a wide variety of applications such as image registration, verification, tracking, stereo image processing, compression, image stitching, and rendering.

A desirable method for solving this problem should be robust enough to find a correct match under circumstances happening in the real world scenarios such as background clutter, occlusions, and geometric transformations. It should be also sufficiently fast to localize the query image from a large number of candidate regions in a reference image within a reasonable time budget.

Exhaustive search with sliding windows gives satisfactory matching accuracy. However, the exhaustive search is often prohibitive, due to a huge number of windows needed to be evaluated. Most of the existing methods overcome this problem by introducing an idea of pruning which aims to reduce the run time by skipping unnecessary windows or pixels that will not change the final result as much as possible.

Non-patent literature 1 reduces the run time by adaptively sliding a window more than one pixel. The decision on the amount of slide is based on a rank defined for each feature in a pattern. Non-patent literature 2 proposes a method that relies on a subset (usually small subset) of pairs of pixels which speeds-up matching and makes it robust to background clutter. Non-patent literature 3 accelerates a search process by combining random sampling of geometrical transformations, distance approximations, and branch-and-bound search. Non-patent literature 4 reduces a computation cost by skipping a mismatch position based on principal orientation difference features.

PRIOR-ART DOCUMENTS

Non-Patent Literatures

[Non-patent literature 1] Pele O, Werman M, "Accelerating pattern matching or how much can you slide?", In Asian Conference on Computer Vision, 2007 Nov. 18 (pp. 435-446), Springer, Berlin, Heidelberg.

[Non-patent literature 2] Dekel T, Oron S, Rubinstein M, Avidan S, Freeman WT, "Best-buddies similarity for robust template matching", In Proceedings of the IEEE Conference on Computer Vision and Pattern Recognition, 2015 (pp. 2021-2029).

[Non-patent literature 3] Korman S, Reichman D, Tsur G, Avidan S, "Fast-match: Fast affine template matching", In Proceedings of the IEEE Conference on Computer Vision and Pattern Recognition, 2013 (pp. 2331-2338).

[Non-patent literature 4] Jiao J, Wang X, Deng Z, Cao J, Tang W, "A fast template matching algorithm based on principal orientation difference", International Journal of Advanced Robotic Systems, 2018 May 25; 15(3): 1729881418778223.

[Non-patent literature 5] Ba J, Mnih V, Kavukcuoglu K, "Multiple object recognition with visual attention", arXiv preprint arXiv: 1412.7755, 2014 Dec. 24.

[Non-patent literature 6] Ablavatski A, Lu S, Cai J, "Enriched deep recurrent visual attention model for multiple object recognition", In Applications of Computer Vision (WACV), 2017 IEEE Winter Conference on, 2017 Mar. 24 (pp. 971-978).

[Non-patent literature 7] Mnih V, Heess N, Graves A, "Recurrent models of visual attention", In Advances in neural information processing systems, 2014 (pp. 2204-2212).

[Non-patent literature 8] Hel-Or Y, Hel-Or H, David E, "Fast template matching in non-linear tone-mapped images", In Computer Vision (ICCV), 2011 IEEE International Conference on, 2011 Nov. 6 (pp. 1355-1362).

DISCLOSURE OF INVENTION

Problem(s) to be Solved by the Invention

The pruning-based image matching methods described in the non-patent literatures 1-4 still need to evaluate a large number of windows or pixels for identifying a target region that matches a query image, which makes the overall search process inefficient.

In addition, these methods do not consider optimizing a search path (i.e., a sequence of windows or pixels to be evaluated) for identifying the target region while identifying the target region. Therefore, these methods are less robust to background clutter, occlusion, and geometric transformations, for example.

It is desirable to reduce the number of candidate regions such as windows or pixels to be evaluated not only in image matching applications but also in other applications which handle media data such as video frames and acoustic signals.

The present invention is made in the view of the above-mentioned problems and it is an object of the present invention to provide a search apparatus, a training apparatus, a search method, a training method, and a program, which can reduce the number of candidate regions to be evaluated in media data and more efficiently find a target region that matches query data from the media data.

Means for Solving the Problem(s)

In one aspect of the present invention, there is provision for a search apparatus for searching media data for a target region that matches query data, including:

a first feature extraction unit configured to extract a first feature vector from the query data using a first trained neural network;

a second feature extraction unit configured to obtain a first region from the media data and extract a second feature vector from the first region using a second trained neural network;

a localization unit configured to determine a candidate for the target region using a third trained neural network, based on the first feature vector, the second feature vector, and the first region or a location of the first region; and a control unit configured to repeat the operations of the second feature extraction unit and the localization unit until a predetermined condition is satisfied, by using the determined candidate for the target region as the first region to be used by the second feature extraction unit.

In another aspect of the present invention, there is provision for a training apparatus for training neural networks to be used to search media data for a target region that matches query data, including:

a first feature extraction unit configured to extract a first feature vector from training query data using a first neural network;

a second feature extraction unit configured to obtain a first region from training media data and extract a second feature vector from the first region using a second neural network;

a localization unit configured to determine a candidate for the target region using a third neural network, based on the first feature vector, the second feature vector, and the first region or a location of the first region;

a control unit configured to repeat the operations of the second feature extraction unit and the localization unit until a predetermined condition is satisfied, by using the determined candidate for the target region as the first region to be used by the second feature extraction unit; and a training unit configured to determine whether the candidate for the target region determined by the localization unit captures the target region, and update parameters of the first neural network, the second neural network, and the third neural network, based on a result of the determination.

In another aspect of the present invention, there is provision for a search method used by a search apparatus to search media data for a target region that matches query data, including the steps of:

extracting a first feature vector from the query data using a first trained neural network;

obtaining a first region from the media data and extracting a second feature vector from the first region using a second trained neural network;

determining a candidate for the target region using a third trained neural network, based on the first feature vector, the second feature vector, and the first region or a location of the first region; and repeating the obtaining step and the determining step until a predetermined condition is satisfied, by using the determined candidate for the target region as the first region to be used in the obtaining step.

In another aspect of the present invention, there is provision for a training method used by a training apparatus to train neural networks to be used to search media data for a target region that matches query data, including the steps of:

extracting a first feature vector from training query data using a first neural network;

obtaining a first region from training media data and extracting a second feature vector from the first region using a second neural network;

determining a candidate for the target region using a third neural network, based on the first feature vector, the second feature vector, and the first region or a location of the first region;

repeating the obtaining step and the determining step until a predetermined condition is satisfied, by using the determined candidate for the target region as the first region to be used in the obtaining step; and determining whether the candidate for the target region captures the target region, and updating parameters of the first neural network, the second neural network, and the third neural network, based on a result of the determination.

In another aspect of the present invention, there is provision for a program that causes a computer to function as the search apparatus or the training apparatus as described above.

Advantageous Effect of the Invention

According to the present invention, it is possible to reduce the number of candidate regions to be evaluated in media data and more efficiently find a target region that matches query data from the media data.

BRIEF DESCRIPTION OF THE DRAWINGS

FIG. 8 is a table illustrating an image matching success rate;

FIG. 9 is a table illustrating the number of windows evaluated to localize a query image;

FIG. 10 is a table illustrating an average run time to localize a query image;

DETAILED DESCRIPTION OF THE PREFERRED EMBODIMENTS

Embodiments of the present invention are described below with reference to the drawings.

First Embodiment

A first embodiment describes overall architecture of a search apparatus for searching media data for a target region (hereinafter also referred to as a "target window") that matches query data. The media data and the query data are, for example, still images, video frames, acoustic signals, or any other data, respectively. The search apparatus uses a model (specifically, neural networks) trained by a training apparatus to find the target region that matches the query data from a plurality of candidates (hereinafter also referred to as "candidate regions" or "candidate windows") for the target region in the media data. Specifically, the search apparatus iteratively compares the query data and a candidate region by using the trained model and determines whether the candidate region matches the query data, and thereby finds the target region. The model is trained to reduce candidate regions to be evaluated, and thus the search apparatus can find the target region with a smaller number of candidate regions.

The first embodiment further describes a training apparatus for training the model to be used by the search apparatus. The training apparatus may be different from the search apparatus or may be the same as the search apparatus. In the following description, it is assumed that the training apparatus is different from the search apparatus.

[Search Apparatus]

Figure 1:
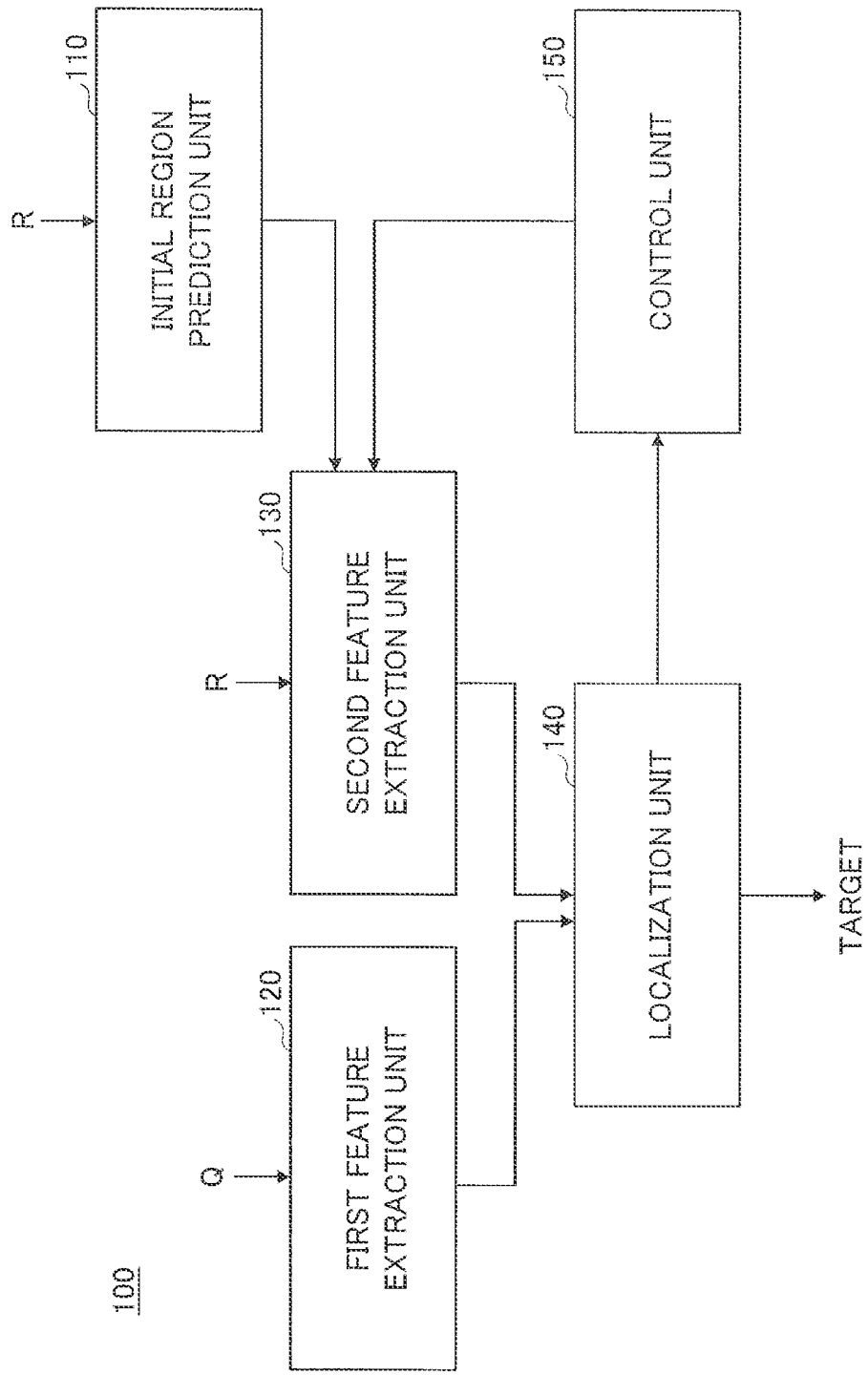
FIG. 1 is a diagram illustrating a functional configuration of a search apparatus according to a first embodiment of the present invention.

FIG. 1 is a diagram illustrating a functional configuration of a search apparatus 100 according to the first embodiment of the present invention. An objective of the search apparatus 100 is to localize a target region represented by query data Q which exists at a certain location $l_g$ in media data R. The location $l_g$ may be a center of the region, a corner of the region, or any other location that can be used to define the region. When the media data R is a still image, the location $l_g$ can be represented by x and y image coordinates. When the media data R is a video frame, the location $l_g$ can be represented by a time stamp (or frame index). The location $l_g$ may also include the x and y image coordinates of the time frame. When the media data R is an acoustic signal, the location $l_g$ can be represented by a time stamp. The search apparatus 100 may also determine another kind of information used to define the target region, such as a window size, a direction, or any combination of them.

The search apparatus 100 iteratively compares the query data Q and a candidate region in the media data R to determine whether the candidate region matches the query data Q. Assuming that R(l) is a region of the media data R at the location 1, the target region can be represented by $R(l_g)$, and a candidate region to be evaluated at an iteration count t can be represented by $R(l_t)$. As described below, the search apparatus 100 uses a trained model to determine a search path (i.e., a sequence of locations of candidate regions) $\{l_t\}_{t=0}^{T}$ so that the target region can be localized with a smaller number T of iteration counts, where T is a maximum number of iteration counts.

The search apparatus 100 includes a first feature extraction unit 120, a second feature extraction unit 130, a localization unit 140, and a control unit 150. The search apparatus 100 may further include an initial region prediction unit 110.

The initial region prediction unit 110 is a neural network that takes, as an input, the media data R and outputs an initial region $R(l_0)$ to be evaluated or its location $l_0$. The neural network may be a convolutional neural network (CNN) or any other neural network. For an acoustic signal, a recurrent neural network (RNN) or a long-short term memory (LSTM) may be used. The initial region prediction unit 110 down-samples the media data R into down-sampled media data $R_{coarse}$ and obtains an initial region $R(l_0)$ based on the down-sampled media data $R_{coarse}$. The initial region $R(l_0)$ is extracted from the media data R at an initial location $l_0$, which may be obtained by linearly projecting features of the down-sampled media data $R_{coarse}$ into a location vector. The initial region $R(l_0)$ is the first candidate region to be evaluated by the second feature extraction unit 130.

It should be noted that the initial region prediction unit 110 may not be included in the search apparatus 100 and an initial location $l_0$ may be arbitrarily determined.

The first feature extraction unit 120 is a neural network that takes, as an input, the query data Q and outputs a feature vector f(Q) of the query data Q. The neural network may be also a CNN or any other neural network. For an acoustic signal, a RNN or an LSTM may be used. The first feature extraction unit 120 extracts a feature vector f(Q) from the query data Q.

The second feature extraction unit 130 is a neural network that takes, as inputs, the media data R and the candidate region $R(l_t)$ or its location $l_t$ (or the initial region $R(l_0)$ or its location $l_0$ if t=0) and outputs a feature vector $f(R(l_t))$ of the media data R. When the location $l_t$ is input to the second feature extraction unit 130, the second feature extraction unit 130 extracts a candidate region $R(l_t)$ at the location $l_t$ from the media data R. The neural network of the second feature extraction unit 130 is the same as that of the first feature extraction unit 120 and shares the same parameter(s) as the neural network of the first feature extraction unit 120. For example, when both the neural networks are CNNs, they use the same parameters such as a filter size, a stride, and so on. The second feature extraction unit 130 obtains the candidate region $R(l_t)$ and extracts a feature vector $f(R(l_t))$ from the candidate region $R(l_t)$. Since the neural network of the second feature extraction unit 130 shares the same parameter(s) as the neural network of the first feature extraction unit 120, a size of the candidate region $R(l_t)$ needs to be the same as a size of the query data Q.

The localization unit 140 is a neural network that takes, as inputs, the feature vector f(Q), the feature vector $f(R(l_t))$, and the candidate region $R(l_t)$ or its location $l_t$ (or the initial region $R(l_0)$ or the initial location $l_0$ if t=0) and outputs a next candidate region $R(l_{t+1})$ or its location $l_{t+1}$ if t<T or a final result (a candidate region $R(l_T)$ or its location $l_T$ if t=T, or a target region that matches the query data Q or its location). The neural network of the localization unit 140 may be an LSTM or any other neural network. The localization unit 140 determines a next candidate region $R(l_{t+1})$, based on the feature vector f(Q), the feature vector $f(R(l_t))$, and the candidate region $R(l_t)$ or its location $l_t$. More specifically, the localization unit 140 combines the feature vector f(Q) and the feature vector $f(R(l_t))$ into a single vector, and then determines a next candidate region $R(l_{t+1})$ or its location $l_{t+1}$ based on the combined vector, the current candidate region $R(l_t)$ or its location $l_t$, and a current internal state (or also referred to as a "hidden state") of the localization unit 140. When the repetition is terminated by the control unit 150 at the maximum iteration count T as described below, the localization unit 140 outputs a candidate region $R(l_T)$ or its location $l_T$. Alternatively, when the candidate region $R(l_t)$ matches the query data Q, the localization unit 140 determines that the candidate region $R(l_T)$ is a target region that matches the query data Q and outputs the target region or its location.

The control unit 150 is a processing unit that takes, as an input, the next candidate region $R(l_{t+1})$ or its location $l_{t+1}$ or the final result, and determines whether to terminate the repetition. The control unit 150 inputs the next candidate region $R(l_{t+1})$ or its location $l_{t+1}$ to the second feature extraction unit 130 and repeats the operations of the second feature extraction unit 130 and the localization unit 140 until a predetermined condition is satisfied. For example, the control unit increments the iteration count by one for each repetition and terminates the repetition when the iteration count t reaches the predefined limit T. Alternatively, for example, the control unit 150 may terminate the repetition, when it is determined by the localization unit 140 that the candidate region $R(l_t)$ is a target region that matches the query data Q.

As described below, the neural networks of the first feature extraction unit 120, the second extraction unit 130, and the localization unit 140 (and the initial region prediction unit 110 if included) are trained using training query data and training media data. When the training query data is input to the first feature extraction unit 120 and the training media data is input to the second feature extraction unit 130 (or the initial region prediction unit 110 if included), the parameters of the neural networks are trained based on a result of determining whether the candidate region $R(l_{t+1})$ determined by the localization unit 140 captures the target region. Further, the neural networks are trained so that a similarity between the feature vector f(Q) extracted by the first feature extraction unit 120 and the feature vector $f(R(l_0))$ extracted by the second feature extraction unit 130 is increased.

[Training Apparatus]

Figure 2:
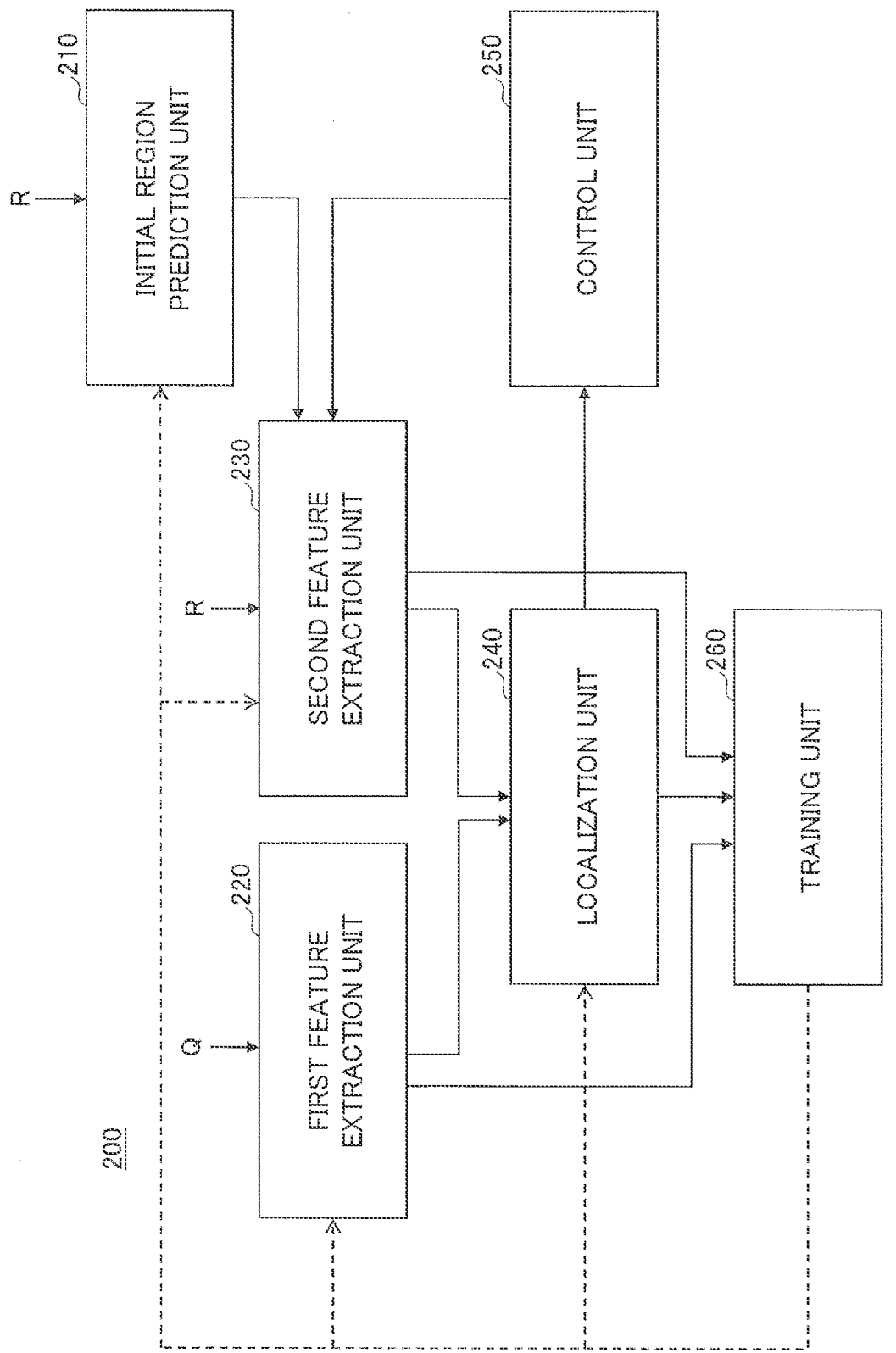
FIG. 2 is a diagram illustrating a functional configuration of a training apparatus according to the first embodiment of the present invention.

FIG. 2 is a diagram illustrating a functional configuration of a training apparatus 200 according to the first embodiment of the present invention. An objective of the training apparatus 200 is to determine a search path $\{l_t\}_{t=0}^T$ with a smaller number T of iteration counts, while localizing a target region.

The training apparatus 200 includes a first feature extraction unit 220, a second feature extraction unit 230, a localization unit 240, a control unit 250, and a training unit 260. The training apparatus 200 may further include an initial region prediction unit 210. The initial region prediction unit 210, the first feature extraction unit 220, the second feature extraction unit 230, the localization unit 240, and the control unit 250 are the same as the initial region prediction unit 110, the first feature extraction unit 120, the second feature extraction unit 130, the localization unit 140, and the control unit 150 in the search apparatus 100, respectively.

The training apparatus 200 uses training data (also referred to as a "query-reference pair") including training media data R and training query data Q as inputs. The training query data Q may be a portion of the training media data R, or data similar to the portion of the training media data R. A correct location of the training query data Q in the training media data R is not necessarily provided.

By using the training media data R and the training query data Q as inputs, a feature vector f(Q) can be obtained by the first feature extraction unit 220, a feature vector $f((R(l_t))$ can be obtained by the second feature extraction unit 230, and a next candidate region $R(l_{t+1})$ or its location $l_{t+1}$ or a final result can be obtained by the localization unit 240.

The training unit 260 is a processing unit that takes, as inputs, the feature vector f(Q), the feature vector $f((R(l_t))$, and the next candidate region $R(l_{t+1})$ or its location $l_{t+1}$ or the final result and outputs parameters of the neural networks of the first feature extraction unit 220, the second extraction unit 230, and the localization unit 240 (and the initial region prediction unit 210 if included). The training unit 260 updates the parameter of the neural networks based on a result of determining whether the candidate region $R(l_{t+1})$ determined by the localization unit 240 captures the target region. Further, the training unit 260 calculates a similarity between the feature vector f(Q) and the feature vector $f((R(l_t))$ and updates parameters of the neural networks based on the similarity between the feature vector f(Q) and the feature vector $f((R(l_t))$. Further, the training unit 260 may use the sequence of locations $\{l_t\}_{t=1}^{t-1}$ to calculate a reward and update parameters of the neural networks based on the reward.

Second Embodiment

A second embodiment describes an image matching method using the concept of the first embodiment. In the second embodiment, media data is a reference image R and query data is a query image Q.

[Search Apparatus]

Figure 3:
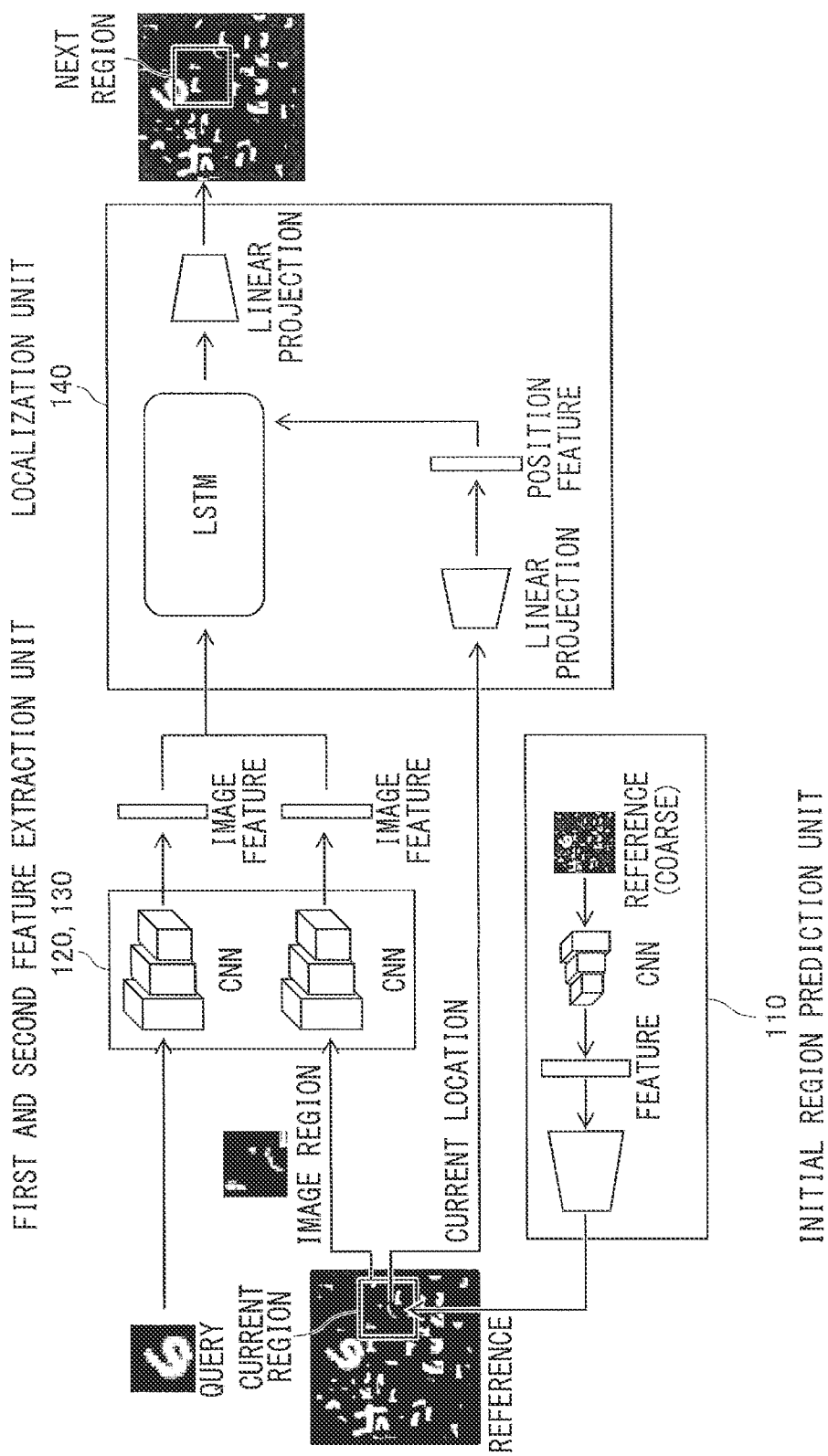
FIG. 3 is a conceptual diagram of a search apparatus according to a second embodiment of the present invention.

FIG. 3 is a conceptual diagram of the search apparatus 100 according to the second embodiment.

In the initial region prediction unit 110, the reference image R is down-sampled into a lower resolution reference image $R_{coarse}$, a feature vector $f(R_{coarse})$ is extracted from the lower resolution reference image $R_{coarse}$ through a CNN, and the feature vector $f(R_{coarse})$ is linearly-projected into a location $l_0$.

In the first feature extraction unit 120, a feature vector f(Q) representing image features is extracted from the query image Q through a CNN. In the second feature extraction unit 130, a feature vector $f(R(l_0))$ representing image features is extracted from the reference image R at the location $l_0$ through a CNN.

Then, in the localization unit 140, the current location $l_0$ is linearly projected into a position vector having the same dimension as the feature vector f(Q) or $f(R(l_0))$, a next hidden state is determined based on a combination of the feature vectors f(Q) and $f(R(l_0))$, a current hidden state of the localization unit 140, and the position vector through an LSTM, and the next hidden state is linearly-projected into a next location $l_1$.

Then, with the given next location $l_1$, the control unit 150 (not illustrated in FIG. 3) repeats the operations of the second feature extraction unit 130 and the localization unit 140 until the number of iteration counts reaches the predefined limit T. Once it reaches the limit, the matching process terminates and a matching result is reported.

Figure 4:
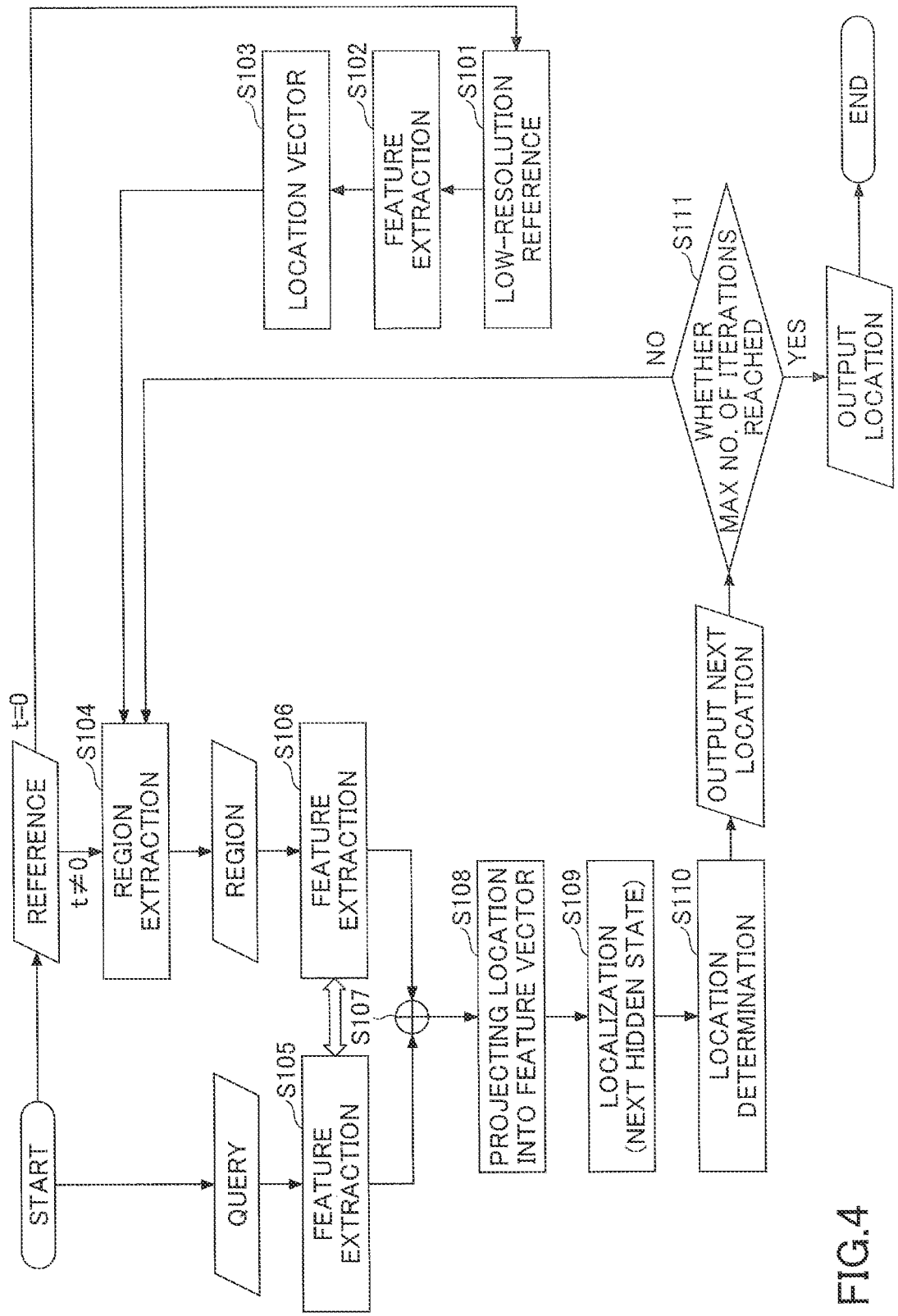
FIG. 4 is a flowchart of an image matching method according to the second embodiment of the present invention.

In the following, each step of an image matching method performed by the search apparatus 100 will be described in more detail with reference to FIG. 4.

Steps S101-S103 relate to initialization steps, which takes a reference image R as an input and outputs an initial location $l_0$.

In step S101, the initial region prediction unit 110 down-samples the reference image R into a lower resolution reference image $R_{coarse}$. The down-sampling of the reference image R may be done by a scaling factor of 3.

Figure 5:
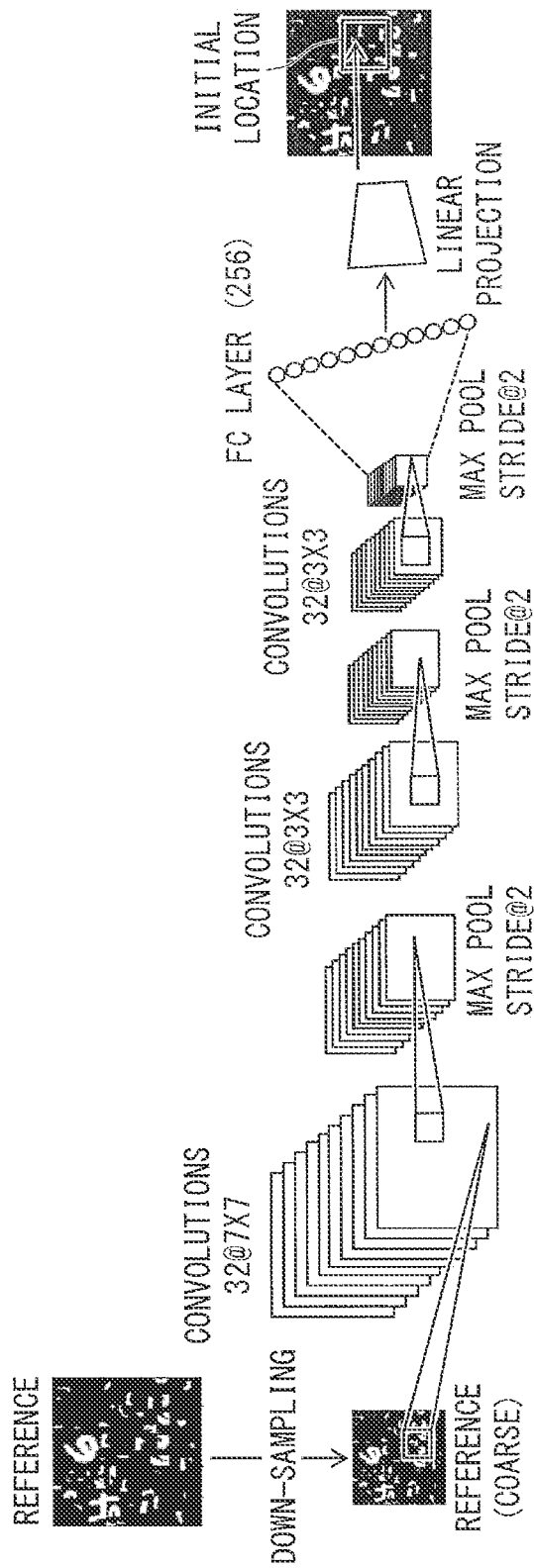
FIG. 5 is a detailed view of a CNN in an initial region prediction unit.

Step S102 is described in detail with reference to FIG. 5. FIG. 5 is a detailed view of the CNN in the initial region prediction unit 110.

The initial region prediction unit 110 employs three convolution layers that map the down-sampled image $R_{coarse}$ to a feature vector $f(R_{coarse})$ Since the feature vector $f(R_{coarse})$ is obtained from the down-sampled reference image $R_{coarse}$, it provides sensible hints on where the potentially interesting region is in the given reference image R. More specifically, the first convolution layer takes $R_{coarse}$ as an input and applies 32 2D convolution filters of a size 7×7, followed by a max-pooling layer with a stride 2. Each of the second and third convolution layers consists of 32 2D convolution filters of the same size 3×3, followed by a max-pooling layer with the same stride 2. Finally, there is a fully-connected (FC) layer which takes the output of third convolution layer and generates a fixed-length feature vector of a length 256.

In step S103, a linear projection is applied to the feature vector $f(R_{coarse})$ obtained in step S102 to reshape it from the length 256 to a location vector of a length 2. Further, the location vector is normalized into a range of −1 to 1.

Steps S104-S106 relate to feature extraction steps.

In step S104, with the location vector in step S103, an image region is extracted from the reference image R at the location $l_0$ represented by the location vector.

Figure 6:
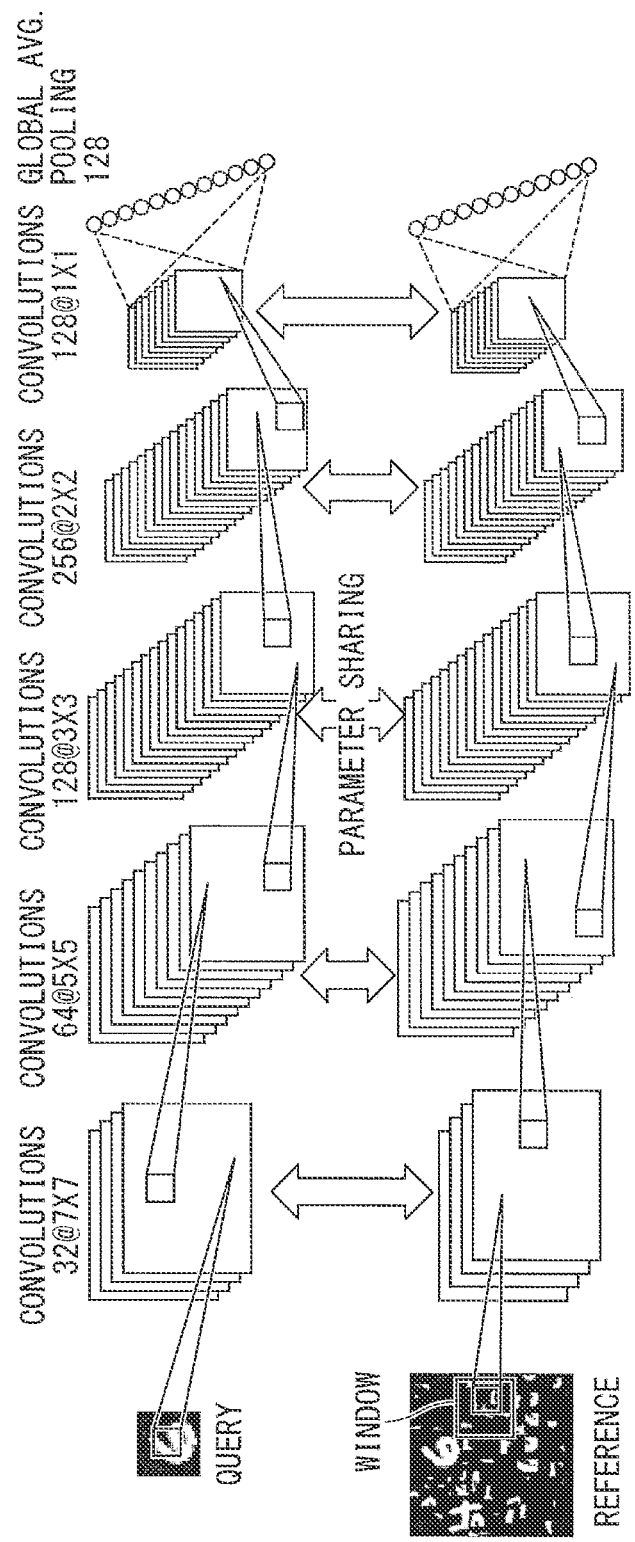
FIG. 6 is a detailed view of CNNs in a first feature extraction unit and a second feature extraction unit.

Step S105 and S106 are described in detail with reference to FIG. 6. FIG. 6 is a detailed view of the CNNs in the first feature extraction unit 120 and the second feature extraction unit 130. Since the location $l_t$ is repeatedly determined under the control of the control unit 150, the iteration count is generally denoted as t in the following description. It should be noted that the initial location $l_0$ is used when the iteration count is 0.

The first feature extraction unit 120 and the second feature extraction unit 130 employ five convolution layers that map the query image Q and the extracted image region $R(l_t)$ to feature vectors $f(Q)$ and $f(R(l_t))$, respectively. More specifically, the first feature extraction unit 120 and the second feature extraction unit 130 are CNNs with the same parameters, designed to have a sequence of five convolutional-rectified linear unit (Conv-ReLU) layers (ReLU activation after 2D convolutions), followed by a global average pooling. This is fully-convolutional and does not have any fully-connected layers. The advantage of this configuration is that it can extract a feature vector of the same length (128) from an input image of an arbitrary size. The specification of each convolution layer is as following; layer 1: 32 2D convolution filters (filters: 7×7 and stride: 1×1), layer 2: 64 2D convolution filters (filters: 5×5 and stride: 1×1), layer 3: 128 2D convolution filters (filters: 3×3 and stride: 1×1), layer 4: 256 2D convolution filters (filters: 1×1 and stride: 1×1), and layer 5: 128 2D convolution filters (filters: 1×1 and stride: 1×1).

In step S107, the fixed-length feature vectors $f(Q)$ and $f(R(l_t))$ obtained from the first feature extraction unit 120 and the second feature extraction unit 130 are combined into a single vector of a length 256.

Steps S108-S110 relate to localization steps, where the localization unit 140 sequentially predicts the next location $l_{t+1}$ based on three inputs including the combined vector of image feature vectors $f(Q)$ and $f(R(l_t))$, the current location $l_t$, and the current state of the LSTM $h_t$ through the LSTM.

Since the location $l_t$ is lower-dimensional (2D) compared to the feature vectors (256), the resulting vector is dominated by the elements of the feature vectors, which makes it difficult to capture useful location information. To avoid this, in step S108, the current location $l_t$ is first encoded by a linear projection to a position vector which has the same dimension as the feature vectors and then combined with them.

In step S109, if t=0, an initial hidden state $h_0$ of the LSTM is determined by the feature vectors $f(R_{coarse})$ of the down-sampled lower resolution reference image obtained in step S101. Then, the three inputs including the combined vector, the current location $l_t$, and the current hidden state $h_t$ are combined to form a single vector and input to the LSTM.

The output of the localization unit 140 is a fixed length vector (256) of a next hidden state $h_{t+1}$.

In step S110, the resulting next hidden state $h_{t+1}$ of the LSTM is translated to the expected location of the next region $\hat{l}_{t+1}$ by a linear projection. It is assumed that an actual position of the next region $l_{t+1}$ is a stochastic variable that follows a Gaussian distribution, where $\hat{l}_{t+1}$ gives a mean vector. Specifically, $l_{t+1}$ is obtained as a sample from the distribution $N(\hat{l}_{t+1}; \lambda I)$ as $l_{t+1} \sim N(\hat{l}_{t+1}; I)$, where I is an identity matrix and $\lambda$ is a network hyper-parameter.

Then, in step S111, the control unit 150 increments the iteration count t by one and repeats steps S104 and S106-S110 until the maximum number T of iteration counts is reached. When the maximum number T of iteration counts is reached, the location $l_t$ is output. For simplicity, the maximum number T of iteration counts may be fixed to 6. Alternatively, T can be adaptively determined.

[Training Apparatus]

Figure 7:
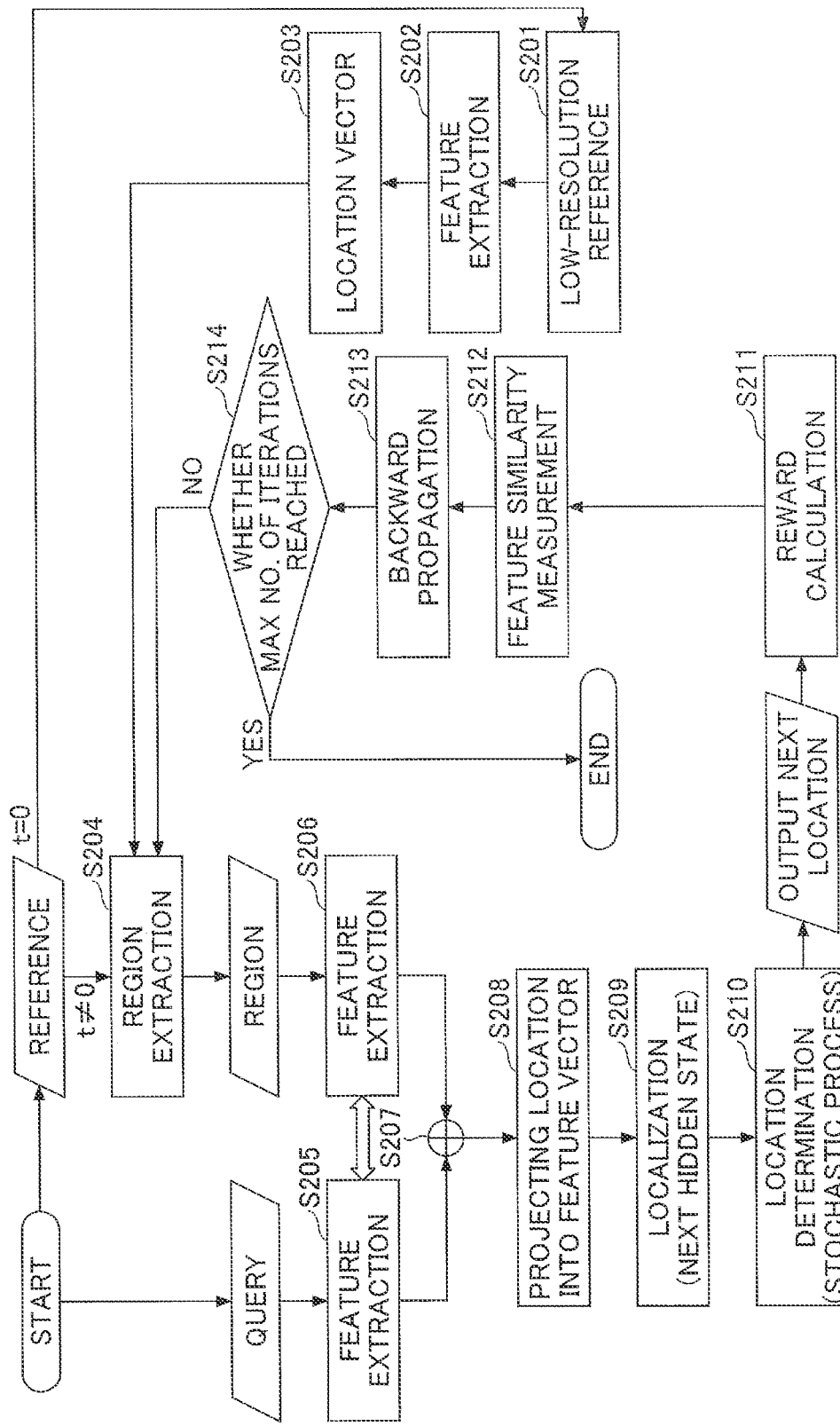
FIG. 7 is a flowchart of a training method according to the second embodiment of the present invention.

In the following, each step of a training method performed by the training apparatus 200 will be described in more detail with reference to FIG. 7.

Since the target region is localized in a sequential manner, in other words, the current decision is made depending on all the past decisions, the decision at each iteration count cannot be evaluated independently. Thus, typical supervised or unsupervised learning methods which assume that samples are independently and identically distributed cannot be applied. In order to handle the dependency on the past decisions, the decision process is modeled as a partially observable Markov decision process (POMDP), so the training can be performed in a reinforcement learning manner. Specifically, a policy gradient method is used to train the networks.

In this problem, a policy determines how to choose a next location for matching. In order to solve the problem, it is assumed that an actual position of a next location is a stochastic variable that follows a Gaussian distribution with a mean $\hat{l}_{t+1}$ and a standard deviation $\lambda$. It is also assumed that only the mean $\hat{l}_{t+1}$ is to be trained and $\lambda$ is a hyper-parameter.

The training process starts from passing a training data (a query-reference pair) to the initialization unit 210.

In steps S201-S203, the initialization unit 210 outputs an initial location $l_0$, as described in steps S101-S103.

In steps S204-S206, the first feature extraction unit 220 and the second feature extraction unit 230 extract feature vectors as described in steps S204-S206.

In steps S207-S210, a random stochastic process (Gaussian distribution) is applied to the output of the localization unit 240 to generate the result i.e., a next predicted location $l_t$.

In step S211, the training unit 260 calculates a reward based on the accuracy of the predicted location $l_t$. Further, in step S212, the training unit 260 calculates a similarity between the feature vectors and $f(R(l_t))$.

In step S213, with the calculated reward and the similarity, the training unit 260 starts backpropagation to update neural network parameters. The backpropagation bypasses the stochastic process in step S210 and updates parameters of differential networks in the localization unit 240, the second feature extraction unit 230, the first feature extraction unit 220, and the initial region prediction unit 210.

Conceptually, the backpropagation through the neural networks can be taken as if the parameters of the neural networks are updated so that a more reward will be given in the future.

In summary, this training method can jointly learn image features as well as search paths, i.e., the sequence of the locations to be searched, in a unified framework. There are some recurrent attention models for image recognition as proposed in Non-patent literature 5; Non-patent literature 6; and Non-patent literature 7. Unlike these, the training method of the second embodiment is customized to image matching task and designed to learn image features effectively for similarity matching. Furthermore, the entire model can be trained with less supervision, i.e., unlike these models, any class labels for training are not required.

The training method is further described in detail below.

It is assumed that $\theta=\{\theta_f, \theta_l\}$ is a set of parameters of the whole model, where $\theta_f$ is a set of parameters of the first and second feature extraction units 220 and 230, and $\theta_l$ is a set of parameters of the localization unit 240. It should be noted that $\theta=\{\theta_f, \theta_l, \theta_i\}$ may be alternatively defined, where $\theta_i$ is a set of parameters of the initial region prediction unit 210. In order to tune $\Theta$, reinforcement learning is used.

Since the location $l_t$ is sequentially determined as described above, $l_t$ is determined with the condition on all the past locations. For notational simplicity, it is defined that $s_{t-1}=\{\{l_\tau\}_{\tau=1}^{t-1}, Q, R\}$. The policy of this model can be represented as a conditional distribution $\pi(l_t|s_{t-1}; \Theta)$. An objective of the training is to maximize a total reward $R=\Sigma_{t=1}^T r_t$ with respect to $\Theta$, where $r_t$ is a reward function. A natural choice for the reward function $r_t$ may be based on success or failure of the search at an iteration count t; $r_t=1$ if the window at an iteration count t correctly captures the location $l_g$, and $r_t=0$ otherwise. Whether the window correctly captures the location $l_g$ may be determined based on an intersection over union (IoU) between the window and the region $R(l_g)$. The expected value of the total reward is given as the following equation (1). In this manner, the parameters are determined during the training based on whether the window at the iteration count t corresponding to a candidate for the target region correctly captures the location $l_t$ corresponding to the target region, in other words, based on whether the window at the iteration count t corresponding to a candidate for the target region matches the location $l_t$ corresponding to the target region.

$$J(\Theta)=\mathbb{E}_{p(s_T;\Theta)}[R] \qquad (1)$$

where $p(s_T; \Theta)$ is a probabilistic distribution of $s_T$ which depends on the policy n. By using the definition of the expectation, the total expected reward for a location $l_t$ can be rewritten as the following equation (2).

$$J(\Theta) = \sum_{l_t} \pi(l_t | s_{t-1}; \Theta)R \qquad (2)$$

The gradient of the expected reward at an iteration count t can be defined as the following equation (3).

$$\nabla_\Theta J(\Theta) = \nabla_\Theta \sum_{l_t} \pi(l_t | s_{t-1}; \Theta)R \qquad (3)$$

By swapping the sum and the gradient in the equation (3) and both multiplying and dividing by the policy, the equation (3) can be rewritten as the following equation (4).

$$\nabla_\Theta J(\Theta) = \sum_{l_t} \pi(l_t | s_{t-1}; \Theta)\frac{\nabla_\Theta \pi(l_t | s_{t-1}; \Theta)}{\pi(l_t | s_{t-1}; \Theta)} R \qquad (4)$$

The following equations (5) and (6) are derived from the equation (4) by simply using fact that $$\nabla_\theta \log z = \frac{1}{z}\nabla_\theta z.$$

$$\nabla_\Theta J(\Theta) = \sum_{l_t} \pi(l_t | s_{t-1}; \Theta)\nabla_\Theta \log\pi(l_t | s_{t-1}; \Theta)R \qquad (5)$$

$$= \mathbb{E}_{p(s_T;\Theta)}[\nabla_\Theta \log\pi(l_t | s_{t-1}; \Theta)R] \qquad (6)$$

The left-hand side of the equation (6) means that at the current location $l_t$, in order to have a higher reward in the feature, the parameters should be updated in the direction of gradient of the reward function, which is same as the direction of maximizing the likelihood $\log \pi(l_t|s_{t-1}; \Theta)$ of the location $l_t$ with the reward R (the right-hand side of the equation (6)).

Although the gradient with respect to 8 is non-trivial, it can be approximately computed by sampling the sequences of $\{l_t; s_{t-1}\}_{t=1}^T$ from the policy in a similar way to Monte-Carlo approximation, which gives the following equation (7).

$$\nabla_\Theta J(\Theta) \approx \frac{1}{M}\sum_{i=1}^M \sum_{t=1}^T \nabla_\Theta \log\pi(l_t^i | s_{t-1}^i; \Theta)R^i \qquad (7)$$

where M is the number of sample sequences. By using this equation (7), 8 can be iteratively updated through gradient ascent.

Training the model only with reinforcement learning often makes the prediction results unstable. Hence, in the second embodiment, another loss function is introduced to improve the stability of the learning process. Specifically, the image feature vectors f(Q) and f(R($l_t$)) respectively extracted by the first feature extraction unit 220 and the second feature extraction unit 230 are used to measure a similarity between f(Q) and f(R($l_t$)); the distance between the two feature vectors should be small for matching pairs and large for non-matching pairs.

In order to get a ground-truth label for matching and non-matching pairs, it is not necessary to use supervised information. The ground-truth label can be directly inferred from the reward provided for each pair while training the neural networks. If the reward is one, the pair is matching; otherwise it is treated as a non-matching pair. To this end, the following loss function (8) is introduced in the first feature extraction unit 220 and the second feature extraction unit 230, similar to a contrastive loss function in widely-used Siamese networks.

$$L(\theta_f) = \sum_{t=1}^T r_t d^2 + (1 - r_t)\max\{0, m - d\}^2 \qquad (8)$$

where $d=\|f(Q)-f(R(l_t))\|$ and m is a margin. This is piecewise differentiable with respect to $\theta_f$ and thus can be optimized with gradient descent.

<Evaluation Result>

To evaluate the image matching method described in an embodiment of the present invention, two benchmark datasets, MNIST (http://yann.lecun.com/exdb/mnist/) and FlickrLogos-32 (http://www.multimedia-computing.de/flickrlogos/), were used.

[Datasets]

Regarding MNIST, three datasets were generated on the basis of the MNIST dataset. The first dataset is referred to as "Translated MNIST", in which each reference image was generated by placing a 28×28 digit image (an image of 28×28 pixels) at a random location of a 100×100 blank image. More specifically, the location coordinates were random numbers in the range of 0 to the size difference between the blank image and the digit image. The range was set in order to avoid placing the digit image at boundary locations of the blank image.

The second dataset is called "Cluttered MNIST" and is used to evaluate the robustness of the image matching method with regard to background clutter. Here, each reference image was generated by adding random 9×9 sub-patches from other random digit images to random locations of a Translated MNIST reference image. Specifically, first, a 28×28 digit image was randomly selected, then, 9×9 pixel sub-patches of the other digit images were cropped at random locations, and finally, the sub-patches were embedded in a 100×100 Translated MINIST reference image at randomly-chosen locations. The sub-patches were embedded so as not to overlap the existing digit image. The clutter was controlled by fixing the total number of sub-patches to be inserted.

The third dataset is called "Mixed MNIST". A randomly-chosen 28×28 digit image, which is different from a target digit image, was placed at a random location of each cluttered MNIST reference image. Similar to the translated MNIST, the location coordinates were chosen in order to avoid boundary locations and also so as not to overlap with the existing digit image.

All query-reference pairs were prepared for all the three MNIST variants by considering each 100×100 image as a reference image and then selecting a 28×28 query image having the same digit as the target digit image from a master set of 10 centered clean numbers from 0 to 9. Following the standard split of MNIST, 10,000 query and reference pairs were used for testing and the remaining 60,000 pairs were used for training.

Regarding FlickrLogos-32, this dataset originally consists of 8,240 images, divided into 320 logo images in the training set, 3,260 images in the validation set (3,000 non-logo images), and 3,960 images in the test set (3,000 non-logo images). Here, only logo images (2,240) of 32 different logos with 70 images per logo were considered. The training sets and the test sets were composed of 2,000 and 240 query-reference pairs, respectively.

Each pair was generated by considering a logo image in the dataset as the reference image and a tightly-cropped logo of the same brand as the query image. In total, 32 query images were generated, each corresponding to an individual logo. All the reference images were resized to half of their original size; each query image was then resized to the same size of the logo in the reference image.

[Evaluation Setup]

Regarding performance metrics, the image matching method was evaluated in terms of accuracy and speed. Given a query and a reference image, a predicted window corresponding to a region in the reference image was output, which was used to evaluate the accuracy. In particular, image matching was considered as being successful if the intersection over union (IoU) between the predicted window and the ground-truth window was greater than 0.5, following the same standard as in the object detection literature. The success rate was a ratio of the number of image pairs with correct matches to all the pairs.

The efficiency was evaluated in terms of two measures. One is the number of windows evaluated, and the other is run time required for processing each query-reference pair. Specifically, the run-time was determined by taking average of the total time required for matching the query-reference pairs of the test set.

The image matching method according to the embodiment was evaluated in comparison with the two existing image matching methods, BBS (Non-patent literature 2) and MTM (Non-patent literature 8). The same hardware environment was used for each method and hyper-parameters of these methods were carefully tuned.

The model according to the embodiment was trained from scratch using Adam with a batch size of 64 for MNIST and 1 for FlickrLogos-32. The learning rate was kept in the range $[10^{-4}, 10^{-3}]$ with an exponential decay. The MNIST dataset results were reported for 3 epochs, and the results on the FlickrLogos-32 were reported for the 45 epochs on the training set. The variance hyper-parameter of the Gaussian $\lambda$, which is used for sampling a next location, was fixed to 0.22.

The hyper-parameter margin for the contrastive loss function was fixed to 0.2. There is trade-off in choosing margin, such as setting it too high makes the network only care about "non-matching", while setting it too low makes the network not learning anything about "non-matching". In this evaluation, a good margin was determined in a manual way.

In order to implement the gradient update for the stochastic network as described by the reinforce learning (equation (7)), a loss function was used to train only differentiable networks as an approximation by using gradient stop function to pass through gradient directly to the differentiable networks. Specifically, the parameters of the differentiable networks were updated in order to have a desired mean emitted from the differentiable networks.

[Results]

Figure 11:
FIG. 11 is a diagram illustrating a search path to localize a query image.

For all the datasets, the success rate, the number of windows evaluated, and the run time are illustrated in FIGS. 8-10, respectively. In FIGS. 8-11, "Joint-Training" is the result of the embodiment of the present invention. The search path to localize the query image according to the embodiment of the present invention is illustrated in FIG. 11.

Regarding the results on Translated MNIST, as illustrated in FIG. 8, the success rate of the method of the embodiment is best among all the image matching methods. The maximum gain of the embodiment reaches 0.25 over the BBS and 0.27 over MTM. The results clearly demonstrate that the embodiment is able to learn search path very accurately on the Translated MNIST dataset. Second, as illustrated in FIG. 9, the embodiment clearly outperforms the BBS and MTM in terms of the total number of candidate windows evaluated to localize the query image. The method of the embodiment just evaluates 6 candidate windows, whereas the other methods evaluate several thousand windows or more. The advantage of processing only a few windows reflects in the run time. Although the run time is not directly proportional to the number of windows processed since each method has different computation requirement for every pixel, the method of the embodiment is competitive to or much faster than the other two methods, while yielding much better matching accuracy, as illustrated in FIG. 10.

Regarding the results on Cluttered and Mixed MNIST, the success rate of the method of the embodiment is the best among all the image matching methods, as illustrated in FIG. 8. This suggests that the method of the embodiment can successfully learn search path even in the presence of a wide range of background clutters. BBS performs the worst among the three methods. This is because the matching between a query image and candidate windows in BBS is evaluated according to the consistency of the distributions of pixels; two windows were determined as a matching pair if their pixel distributions in (x, y, R, G, B) space are similar. This strategy is not effective on Cluttered and Mixed MNIST where the noise may have the same underlying distribution as the target image. The method of the embodiment can accurately localize the query image in just 8 candidate windows for both Cluttered and Mixed MNIST, as illustrated in FIG. 9. Also, the method of the embodiment is competitive or superior in terms of run time, as illustrated in FIG. 10.

Regarding the results on FlickrLogos-32, this dataset is the most challenging because the target images are different from the query images due to a wide variety of scale changes, viewpoint changes, and deformations. FIG. 8 illustrates that the method of the embodiment outperforms all the other methods in accuracy. In terms of run time, the gain of the method of the embodiment is significant compared to the cases of MNIST datasets, as illustrated in FIG. 10. This is because the sizes of the reference images are larger than those of MNIST and the run time of BBS and MTM is almost linear in the reference image size. The run time of the method of the embodiment only depends on the number of windows to be evaluated, which is far smaller than the two baselines, as illustrated in FIG. 9. This suggests that the method of the embodiment is more efficient when it is applied to more realistic and larger size images.

Regarding qualitative results, FIG. 11 illustrates a search path to localize a query image. It can be found that the method of the embodiment has an excellent ability to learn a search path. The results on MNIST datasets show that despite the increased level of search difficulty due to clutter, it is possible to successfully localize the query object with almost the same number of candidate windows evaluated. This is because the method of the embodiment jointly learns a search path and effective features for matching.

Effects of Embodiments

As described above, an embodiment of the present invention addresses a problem of matching a query image to a region in a reference image. The method is based on neural networks (for example, a combination of a CNN and an LSTM) that sequentially output a next location towards a target region at each iteration count. More specifically, an embodiment of the present invention uses a localization unit to determine where to extract a next region from the reference image. In order to maximize the performance of the localization unit, an embodiment of the present invention introduces a reinforcement learning-based technique to predict the next location. Thus, it is possible to pay more attention to the relevant region of the reference image and therefore the number of windows (candidate regions) required to localize the query image is significantly reduced, which leads to faster image matching especially for a large reference image.

Due to the ability of jointly training a search path and effective features based on a similarity between the query image and the reference image, first, the number of candidate windows processed to localize the query image can be far smaller than existing methods, which leads to faster image matching especially for a large reference image. Second, as can be seen in the evaluation results, it is possible to accurately localize the query image even in a severely cluttered reference image.

<Hardware Configuration>

Figure 12:
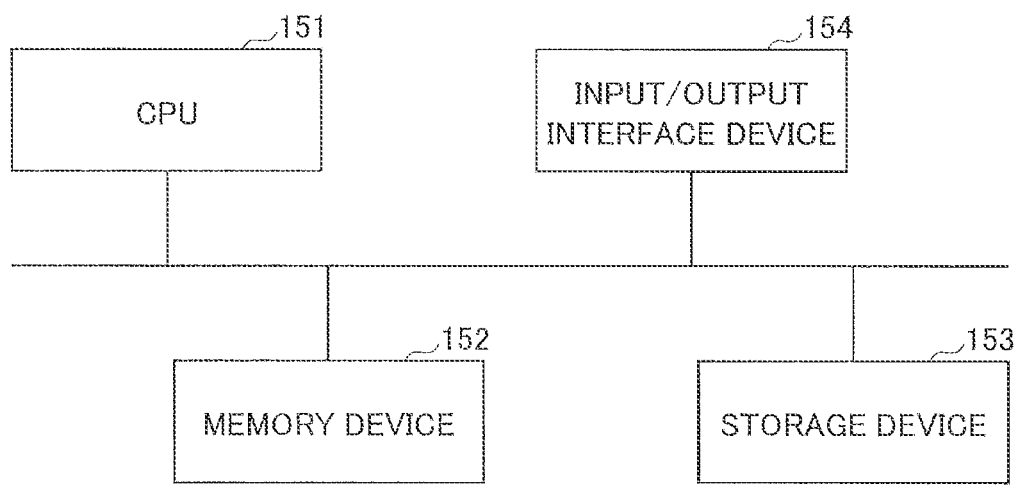
FIG. 12 is a diagram illustrating an exemplary hardware configuration of each apparatus according to an embodiment of the present invention.

FIG. 12 illustrates an example of a hardware configuration of each apparatus (the search apparatus 100 or the training apparatus 200) according to an embodiment of the present invention. Each apparatus may be a computer including a processor 151 such as a CPU (Central Processing Unit), a memory device 152 such as a RAM (Random Access Memory) or a ROM (Read Only Memory), a storage device 153 such as a hard disk, and so on. For example, functions and operations of each apparatus are realized when the CPU processes data and executes a program stored in the storage device 153 or the memory device 152. Information necessary for each device may be input by an input and output interface device 154 and a result obtained by each apparatus may be output by the input and output interface device 154.

<Supplementary Remarks>

For convenience of explanation, each apparatus (the search apparatus 100 or the training apparatus 200) according to the embodiments of the present invention has been described with reference to the functional block diagram, but each apparatus may be implemented in hardware, software, or combinations thereof. For example, the embodiment of the present invention may be realized by a program for causing a computer to implement each function in each apparatus according to the embodiment of the present invention, a program for causing a computer to perform each step in the method according to the embodiment of the present invention, or the like. In addition, two or more functional elements may be combined as appropriate.

While the solution is described to reduce the number of candidate regions to be evaluated in media data and more efficiently find a target region that matches query data from the media data, the present invention is not limited to the embodiments, but various modifications and applications can be made by those skilled in the art within the scope of the claims.

The present international application is based on and claims priority to Japanese Patent Application No. 2019-059437 filed on Mar. 26, 2019, the entire contents of which are hereby incorporated by reference.

DESCRIPTION OF NOTATIONS 100 search apparatus
110 initial region prediction unit
120 first feature extraction unit
130 second feature extraction unit
140 localization unit
150 control unit
200 training apparatus
210 initial region prediction unit
220 first feature extraction unit
230 second feature extraction unit
240 localization unit
250 control unit
260 training unit

The invention claimed is:

1. An apparatus, comprising:
a processor; and
a memory that stores instructions, that when executed by the processor, cause the processor to
extract a first feature vector from query data by a first neural network;
obtain a first region from media data and extract a second feature vector from the first region by a second neural network;
determine a candidate for a target region by a third neural network, based on the first feature vector, the second feature vector, and the first region or a location of the first region;
repeat the operation of obtaining the first region and the operation of determining the candidate for the target region until a predetermined condition is satisfied, by using the determined candidate for the target region as the first region to be used in the operation of obtaining the first region, wherein the third neural network has been trained to minimize a number of executing the repeat operation according to reinforcement learning, and the candidate for the target region depends at least on a previously determined candidate during a previous iteration of the repeat operation;
determine whether the determined candidate for the target region captures the target region, and update parameters of the first neural network, the second neural network, and the third neural network, based on a result of the determination of the candidate capturing the target region;
extracting result media data from the media data according to the determined candidate for the target region to remove; and
presenting the result media data as a result of a query according to the query data.

2. The apparatus as claimed in claim 1, wherein the first neural network, the second neural network, and the third neural network are trained using training query data and training media data based on a result of determining whether the candidate for the target region determined captures the target region, for the first feature vector extracted from the training query data and the first region obtained from the training media data.

3. The apparatus as claimed in claim 1, wherein a parameter of the first neural network is the same as a parameter of the second neural network.

4. The apparatus as claimed in claim 1, wherein the instructions further cause the processor to
down-sample the media data into down-sampled media data and obtain the first region based on the down-sampled media data using a fourth neural network.

5. The apparatus as claimed in claim 1, wherein the updating parameters of the first neural network, the second neural network, and the third neural network, causes an increase of similarity between the first feature vector and the second feature vector.

6. The apparatus as claimed in claim 4, wherein a parameter of the fourth neural network is updated together with the parameters of the first neural network, the second neural network, and the third neural network, based on the result of determining whether the candidate for the target region captures the target region.

7. A computer-implemented method, comprising:
extracting a first feature vector from query data by a first neural network;
obtaining a first region from media data and extracting a second feature vector from the first region by a second neural network;
determining a candidate for a target region using a third neural network, based on the first feature vector, the second feature vector, and the first region or a location of the first region;
repeating the obtaining step and the determining step until a predetermined condition is satisfied, by using the determined candidate for the target region as the first region to be used in the obtaining step, wherein the third neural network has been trained to minimize a number of executing the repeat operation according to reinforcement learning, and the candidate for the target region depends at least on a previously determined candidate during a previous iteration of the repeat operation;
determine whether the determined candidate for the target region captures the target region, and update parameters of the first neural network, the second neural network, and the third neural network, based on a result of the determination of the candidate capturing the target region;
extracting result media data from the media data according to the determined candidate for the target region to remove; and
presenting the result media data as a result of a query according to the query data.

8. The computer-implemented method according to claim 7, wherein the updating parameters of the first neural network, the second neural network, and the third neural network causes an increase of similarity between the first feature vector and the second feature vector.

9. A non-transitory computer-readable storage medium that stores therein a program that causes a computer to function as an apparatus as claimed in claim 1.

* * * * *